Patented Mar. 26, 1929.

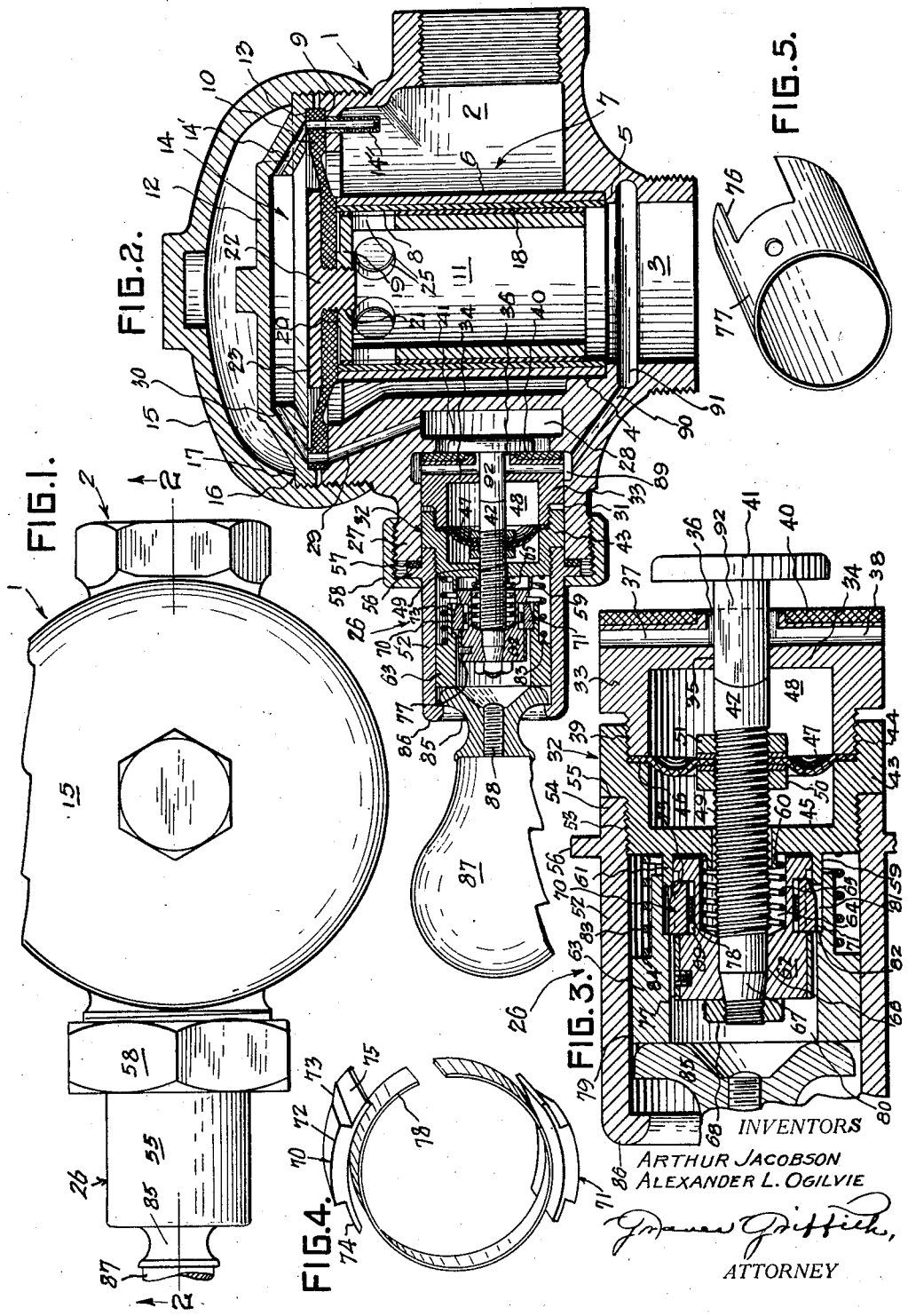

1,706,404

UNITED STATES PATENT OFFICE.

ARTHUR JACOBSON AND ALEXANDER L. OGILVIE, OF SAN FRANCISCO, CALIFORNIA.

FLUSHING VALVE.

Application filed May 4, 1927. Serial No. 188,640.

The present invention relates to improvements in flush valves in general, but more particularly to those designed and installed for flushing purposes.

The valve shown and described in this application is a simplified form of somewhat similar construction and operation to that shown and described in our co-pending application for flush valves, filed May 18, 1925, Serial No. 30,903, in the United States Patent Office, and issued in Canada, August 24, 1926, No. 263,675, and in Great Britain, May 6, 1926, No. 251,569, but differing therefrom, in that the arrangement has been rendered more practical and efficient through the application thereto of a leak-proof relief valve operable through a side control-handle, and other constructional details, chief of which are the omission of the centrally arranged working barrel and the substitution therefor of a removable liner that, when worn away, may be readily and cheaply replaced by a new one.

The primary object of the present invention is the provision of a flush valve having a relief valve combined therewith and operable through an inward thrust of its handle or push button to unbalance the equalized pressures in the main valve above and below the diaphragm, to cause a predetermined quantity of water to be discharged through the main valve outlet.

Another object of our invention is the provision of a flush valve having an improved form of leak-proof relief valve, as an auxiliar to the main valve, provided with a conveniently placed operating means of the thrust type.

Another object of our invention is to provide a flush valve having combined therewith a relief valve so designed and arranged as to cause the functioning of the main valve to deliver through its discharge a limited column of water for each complete inward thrust, (not a partial thrust,) to the push button of the relief valve and to allow of the return to normal positions of the working parts of both main and relief valves regardless of whether or not the handle or push button has been released by the operator.

Additional to the foregoing is that of providing, in a valve of the character designated, a removable working barrel carrying an interior non-corrodible lining, as affording a cheap and readily removable construction, when the needs of wear necessitate it, and a replacement at trifling cost.

Other objects and advantages will appear, as pertaining to our construction, as this specification progresses, and be more clearly defined and set forth in the claims hereto appended and forming a part thereof.

In the accompanying drawings, forming a part of this specification, and in which similar characters of reference refer to like parts, throughout:

Figure 1 is a top plan view of our improved valve;

Figure 2 is a vertical section taken on the line 2—2 of Figure 1, and showing the main valve and combined relief valve arranged as an auxiliar thereto, the diaphragm of the main valve being shown seated as when balanced by equal pressures on both sides thereof;

Figure 3 is a greatly enlarged sectional detail of the relief valve per se and showing the working parts thereof thrust inwardly and as they appear at the instant of release for their return to normal position, the position shown being that assumed by the relief valve when the main valve pressure has been released;

Figure 4 is a perspective view of the relief valve actuating dogs and their split ring which, when in position, constantly urges them outwardly; and Figure 5 is a perspective view of the cylindrical housing which surrounds the actuating dogs and limits their outward movement.

Referring to the drawings in detail, 1, in a general way, represents the valve shell or housing proper, consisting of a cylindrical cast member provided with an inlet opening 2 and a discharge opening 3, the discharge opening 3 being provided with a short bore 4 interiorly finished and provided at its lower end with an annular bead 5 and adapted to receive a liner, or barrel, 6 exteriorly finished at its lower end and forced tightly therein with its lower edge abutting against the bead 5, thus forming a main pressure chamber 7 communicating directly with the inlet 2. The interior of the liner, or barrel, is provided with a smooth bore formed by vulcanizing a coating 8 of hard rubber to its wall to provide a non-corrodible interior working surface. The upper end of the shell 1 is open and provided in its upper face with an annular recess 9 forming a seat for the main diaphragm 10, which carries a centrally arranged valve member 11, to be hereinafter described.

The diaphragm cap member 12 is provided with an annular recess 13 forming a seat corresponding to the recess 9 of the valve casting and is adapted to fit over the upper edge of the diaphragm 10 forming therewith an auxiliary pressure chamber 14. The pressure chamber 14 is provided with an inlet port 14', which port in turn communicates with a strainer 14'' mounted in the inlet 2 of the valve. The upper edge of the shell 1 is exteriorly screw threaded and provided with an interiorly threaded cap 15 having an interiorly arranged shoulder 16 adapted to contact the upper outer edge 17 of the cap 12 to clamp said cap tightly against the diaphragm edge and to form a water-tight joint between said cap 12 and the valve casting proper.

The main piston valve 11 consists of a cylindrical cast shell having its exterior provided with a vulcanized coating of hard rubber 18 similar to that of the interior coating 8 of the working barrel, or liner, 6, in which it is fitted for reciprocal movement, and is provided at its upper end with a head 19 having an annular base 20 forming a seat for the diaphragm 10. The head 19 is centrally tapped, as indicated at 21, to receive an exteriorly threaded clamp-nut 22 having a flange 23 adapted to clamp the central section of the diaphragm tightly against the head 19 of the member 11, the member, as a whole, being carried by the diaphragm, and the under inner surface 24 thereof being adapted to seat upon the upper edge of the valve barrel 6 when the valve is in closed position, Figure 2. The wall of the member 11 is provided with a plurality of discharge openings 25 radially arranged immediately adjacent the head 19 and adapted, when the member 11 is moved vertically by a lowered pressure in the chamber 14, to communicate with the pressure chamber 7 and permit the free discharge of a measured volume of water therethrough to the discharge outlet 3 of the valve.

The present form of the valve is provided with a relief valve 26, which is partially embodied in the integrally formed member 27 positioned on the side of the housing 1 opposite the inlet side 2 and consists of an inner sub-chamber 28 communicating with the auxiliary chamber 14 through the ducts 29 and 30. The member 27 is provided with a bore 31, in which is fitted the relief valve unit 32. Said unit consists of an annular member 33 having an inner end wall 34, a centrally positioned stem bore 35, an annular port 36 communicating with the sub-chamber 28, diametrically opposed ports 37 and 38, both communicating at their inner ends with the port 36, and a reduced exteriorly threaded outer nipple 39. The outer face of the wall 34 of said member 33 is provided with a gasket 40 forming a valve seat for the valve 41 which is carried by the stem 42 as hereinafter described.

A second annular member 43 having an interiorly threaded inner end 44 is screwed upon the threaded nipple 39 of the member 33 and is provided with an outer end wall 45 and shouldered inner section 46 which is adapted, in conjunction with the nipple 39 of said member 33 to clamp tightly between these sections a centrally disposed diaphragm 47, which diaphragm seals the chamber 48 thereof and prevents leakage of water therefrom, which may leak thereinto through the stem bore 35. The diaphragm 47 is provided centrally thereof with a perforation through which the threaded section 49 of the stem 42 extends, said diaphragm being secured to the stem by means of a pair of washers and clamp nuts 50 and 51, which nuts are jammed tightly against opposite faces thereof and seal the perforation therein to insure these parts against leakage.

A cylindrical barrel 52 is secured to the outer exteriorly threaded end 53 of the member 43 by means of its interiorly threaded inner end 54, which end 54 is screwed upon the threaded end 53 of member 43 until it abuts against the shoulder 55, as clearly shown in Figure 3. The said barrel 52 is additionally provided with an annular flange 56 formed upon its exterior surface adjacent the end 54 thereof, this flange being adapted to carry a gasket 57, Figure 2, which is adapted to abut against the outer face of the member 27 of the valve casting, the said barrel being provided with a union nut 58 adapted to bear against the flange 56 and to be screwed upon the exteriorly threaded portion of the member 27 to draw the entire relief valve unit 32 into the bore 31 of the member 27.

The stem 42 extends through an opening 59 concentrically positioned in the wall 45 of the member 43, said opening being somewhat larger than the stem which allows the stem to move freely therein. An annular lip 60 surrounds the opening 59 and projects outwardly from the wall 45 and forms a spring seat as hereinafter described. A second concentrically arranged lip 61 projects from the wall 45 and is considerably larger in diameter than the lip 60, said lip 61 being provided with both interiorly and exteriorly finished surfaces to form guide surfaces for the inner ends of the carrier member 62, and actuating member 63, respectively.

The carrier member 62 is provided with a concentric bore 64 forming a spring housing for the expansion spring 65, which spring surrounds the stem 42 and has its inner end seated upon the annular lip 60 and its outer end seated in the end of the bore 64, said spring tending to normally seat the valve head 41 against the gasket 40. The carrier is additionally provided with a smaller bore 66 communicating with the bore 64 and adapted to receive the tapered end 67 of the valve stem and to which said carrier is rigidly secured by means of a nut 68 which is screwed upon the threaded outer end of the stem 42, as here shown.

The carrier member 62, as hereinbefore described, extends into the interior of the lip 61 and is guided thereby, as shown in Figures 2 and 3, and is adapted for reciprocal movement therein to unseat the valve disc 41, the limit of this inward movement being shown in Figure 3. The said carrier is provided in its exterior surface with a comparatively deep annularly disposed groove 69, in which is housed a pair of diametrically disposed dogs 70 and 71, as clearly shown in Figure 4. These dogs are of duplicate construction and each consist of a head 72, a tapered rear edge 73 and oppositely and laterally disposed arcuate retaining wings 74 and 75, the heads 72 thereof being adapted to project through slots 76 formed in opposite sides of the wall of a retaining sleeve 77, Figure 5, and to be prevented from complete ejection from the groove 69 by means of their wings 74 and 75 coming into contact with the wall of the retaining sleeve 77.

A split ring 78 of expansible character is inserted in the groove 69 beneath the dogs 70 and 71 and tends to normally project said dogs beyond the periphery of the sleeve 77 of the carrier 62, the outward limit of movement of these dogs being shown in Figure 2, and the limit of their inward movement being shown in Figure 3.

The tapered rear edges 73 of the dogs are normally out of contact with the edge of the lip 61, as shown in Figure 2, but when the carrier 62 is moved inwardly into the interior of said lip, the dogs are depressed, as shown in Figure 3.

The actuating member 63 is provided with a finished exterior surface 79 adapted to form a sliding fit within the interior of the barrel 52 and said member has a central bore 80 of slightly larger diameter than the carrier 62 and houses said carrier. The inner end of said bore 80 is counterbored as indicated at 81, which counterbore forms an annular interior shoulder 82 adapted to normally intercept the front edges of the dogs 70 and 71 and to lock the carrier 62 with the actuating member 63, so that when the actuating member is moved inwardly it carries with it the carrier 62, valve stem 42 and valve disc 41 to the position shown in Figure 3. During this inward movement the tapered rear edges 73 of the dogs engage under the lip 61 and are drawn inwardly thereby until the front edges of the dogs are released from the shoulder 82 of the actuating member, which releasing movement causes the immediate return of the stem 42 to normal position and the consequent seating of the valve 41. The return movement of the stem and carrier in nowise affects the actuating member 63, this member being normally urged outwardly by a compression spring 83 surrounding the neck 84 thereof and abutting against the wall 45 of the member 43.

The actuating member 63 is reciprocated in the barrel 52 by means of a bell-shaped member 85 which is normally held in the barrel by means of a shoulder 86 formed in the outer open end thereof, said bell-shaped member having an actuating handle 87 secured thereto by means of a stud 88, as here shown, or it may be provided with any suitable form of push button, or rocking means.

An annular groove 89 is formed in the body of the main valve and surrounds the inner end of the member 33 and communicates with the ports 37 and 38 formed in said member, and a drain port 90 leads from the groove 89 to a groove 91 formed in the wall of the main valve discharge 3.

The valve stem 42 is provided adjacent the valve disc 41 with a flattened portion 92 which prevents the turning of the stem in its guide opening formed in the member 33, and avoids the possibility of the diaphragm 47 becoming loosened relative to the stem.

The operation is as follows: Normally, the pressure chamber 7, the chamber 14 and the chamber 28 contain fluid under pressure from an outside source through the inlet 2 of the valve. The diaphragm 10 is held seated by the balanced pressures above and below the diaphragm as is usual in all types of balanced valves. In operating the valve the handle 87 is tilted or pushed inwardly, which movement forces the actuating member 63 inwardly against spring 83 a sufficient distance to cause the tapered portions 73 of the dogs to engage the lip 61, whereupon the coactional engagement of these parts causes the contraction of said dogs within the groove 69 of the carrier, the while the carrier 62, stem 42 and valve 41 are being carried inwardly and the valve 41 unseated, this inward movement being continued until the dogs are released from the shoulder 82 of the actuating member, their release being occasioned by the immediate return of the carrier 62 and valve 41 to normal positions.

The handle 87 may be held against outward movement for an indefinite period without in any way affecting the return to normal position of the relief valve parts and the main valve cannot be again tripped until the handle is released and allowed to return to normal position to cause the re-engagement of the dogs with the shoulder 82 of the actuating member.

When the valve 41 is "cracked", pressure is released in the chambers 28 and 14, through the medium of the ports 29, 30, 36, 37, 38, 89 and 90, thus unbalancing the pressures above and below the diaphragm and causing the diaphragm to unseat, due to the higher pressure below the diaphragm and the consequent discharge of a measured quantity of water through the discharge opening 25 of the piston valve and thence into the discharge outlet 3 of the main valve.

The period during which the relief valve 41 is functioning to open and close, coupled with the diameter of port 14', determines the quantity of liquid which is discharged through the main valve and this period may be varied by adjusting the various parts of the relief valve to shorten or lengthen such period and to accordingly vary the quantity of liquid discharged from the valve.

Having thus described our invention, we claim, and desire to secure by Letters Patent:

1. In a flush valve of the class described, a main valve casing having an inlet and an outlet, a sub-chamber formed in said casing, a drain port leading from said sub-chamber to the valve outlet, a relief valve unit communicating with said sub-chamber and having valve means formed in its inner end adapted to normally seal said sub-chamber drain port, a stem carried by said valve means, actuating means associated with said stem, normally expanded members carried by said stem and adapted to engage said actuating means, manual means for thrusting said actuating means and stem inwardly to unseat the valve, and means associated with said unit to contract said normally expanded members to cause their release from said actuating means and the automatic reseating of the valve independently of said actuating means.

2. In a flush valve a relief valve therefor consisting of a unit having a valve seat formed at one end, a valve stem carried by said unit, a valve member carried by said stem and adapted to remain normally seated, actuating means associated with said stem, normally expanded members associated therewith and adapted to grip and thrust said stem inwardly to unseat said valve member, and means associated with said unit to release said grip to cause the automatic reseating of said valve member independently of said actuating means.

3. In a flush valve, a relief valve therefor consisting of a unit having a valve seat formed at one end, a valve stem extending through said unit, a diaphragm carried thereby, a valve member borne by the seat end of said stem and adapted to normally engage said seat, actuating means including normally expanded members associated with said stem and adapted to grip and thrust said stem inwardly to unseat the valve member, and means associated with said unit to contract said member and release the grip upon the stem at a predetermined point to cause the return of the stem and the reseating of the valve independently of the return of said actuating means.

4. In a flush valve, a relief valve therefor consisting of a unit having a seat formed at one end and a guide opening extending therethrough, a valve stem operable through the said guide opening, said guide opening and said stem being so fashioned relative to each other as to prevent said stem at all times from turning in said opening, a diaphragm carried by said stem, a valve member borne by the seat end of said stem and adapted to normally engage said seat, actuating means including normally expanded members associated with said stem and adapted to grip and thrust said stem inwardly to unseat the valve member, and means associated with said unit to contract said members and release the grip upon the stem at a predetermined point to cause the return of the stem and the reseating of the valve independently of the return of said actuating means.

5. In a flush valve of the class described, a relief valve therefor consisting of a unit including a barrel, a valve seat formed at one end of said unit, a reciprocal valve stem carried by said unit and having a valve mounted at one end adapted to normally engage said seat, an actuating member mounted in said barrel, a carrier mounted upon said stem and movable through said actuating member, normally expanded members mounted in said carrier and adapted to engage said actuating member, spring means associated with said carrier adapted to normally retract the same and seat the valve, and contracting means carried by said unit and adapted to contract said normally expanded members when brought into contact therewith by the inward thrusting movement of the stem to unseat the valve.

6. A relief valve structure comprising a unit including a barrel, a valve seat formed at one end of said unit, a reciprocal valve stem extending through said unit and having a valve member mounted at one end adapted to normally engage said seat, an actuating member mounted in said barrel and having an interiorly positioned shoulder, a carrier mounted upon said stem and movable through said actuating member, normally expanded members disposed in opposite sides of said carriers and adapted to normally engage the shoulder in said actuating member to lock the actuating member and carrier together for unified movement, spring means associated with said carrier and actuating member and tending to hold the valve seated, and contracting means associated with said carrier and adapted to contract said normally expanded members when brought into contact therewith by the thrusting movement of the stem to open the valve, the said valve being thereby held unseated a predetermined interval until the normally expanded members are released from the actuating member.

In testimony whereof, we hereby affix our signatures.

ARTHUR JACOBSON.
ALEXANDER L. OGILVIE.